Aug. 6, 1935.  J. O. FINK  2,010,181
CLUTCH
Filed Dec. 26, 1930  2 Sheets-Sheet 2
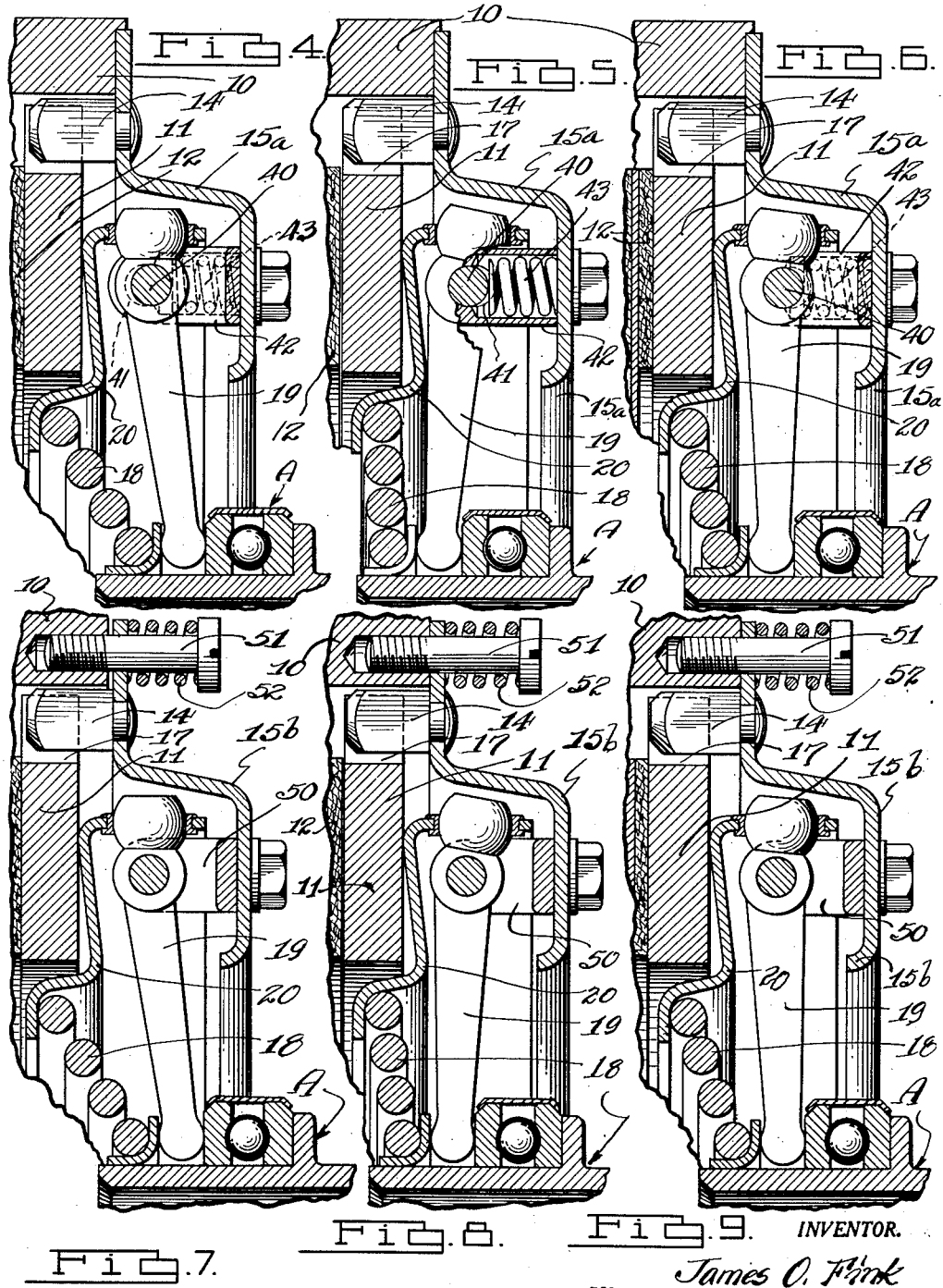

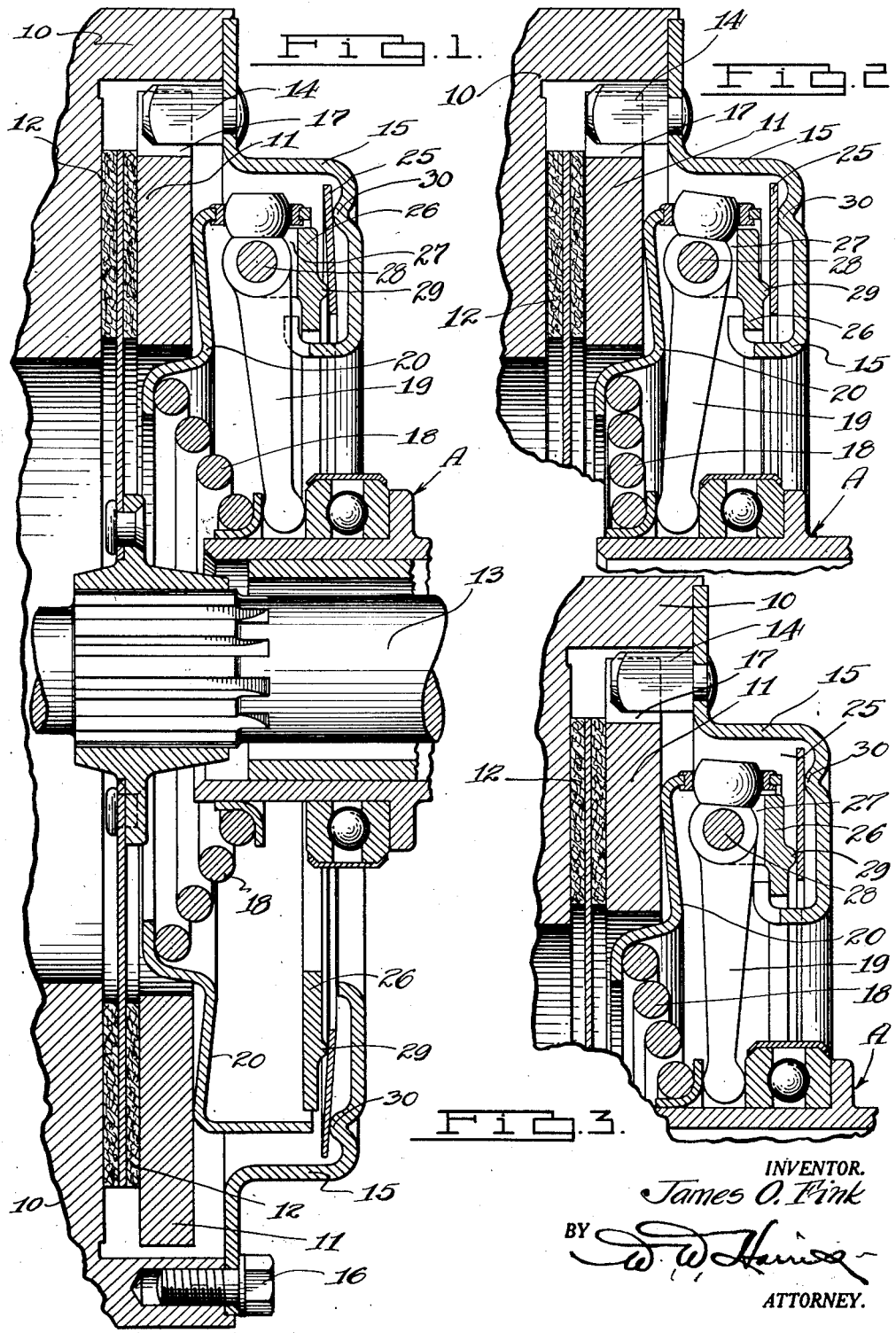

Patented Aug. 6, 1935

2,010,181

UNITED STATES PATENT OFFICE 2,010,181

CLUTCH

James O. Fink, Detroit, Mich., assignor to Continental Motors Corporation, Detroit, Mich., a corporation of Virginia Application December 26, 1930, Serial No. 504,699

10 Claims. (Cl. 192—52)

My invention relates to clutches and more particularly to improvements in clutches of the non-grabbing type preferably employing a substantially flat driven element having substantially a full surface contact with the driving element during the clutching action though the principle of my invention may be advantageously employed with clutch devices in which a variable surface contact is had between the driving and driven elements.

Smoothness in clutching action is quite desirable in clutch devices employed with automobiles and other like vehicles, and others have sought to produce non-grabbing and non-chattering clutch devices by progressively increasing the contacting surface area between the driving and driven elements of the clutch during the clutch engaging action which have given fairly good results. However, it has been found that such clutch devices are subjected to uneven wear because some portions of the clutch facings are subjected to more wear than other portions, with the result that frequent adjustments or replacements of worn parts are necessary to maintain the clutch in working order and as wear takes place the efficiency of the clutch is materially decreased. Clutches employed with trucks and busses are subjected to excessive wear, and clutches of the aforesaid character do not give satisfactory service with this type of vehicle.

It is the object of my present invention to provide a relatively simple, economically manufactured clutch device having generally improved clutching characteristics.

It is the further object of my invention to construct an improved type of clutch for use in various types of machines, automobiles and other like vehicles in which wear is reduced to a minimum, thereby providing a clutch in which frequent adjustments or replacements of worn parts to maintain the clutch in working order is unnecessary.

Another object of my invention is to construct a clutch having non-grabbing and non-chattering characteristics by providing a structure including driving and driven elements which are preferably engaged in full surface contact during the clutching action and by providing means associated therewith to build up the clutching pressure during the clutching action for effecting a gradual engagement of the driving and driven elements of the clutch.

A further object of my invention is to construct an improved type of clutch for the purpose specified by providing a yieldingly supported lever fulcruming means for effecting a gradual engagement of the driving and driven elements of said clutch.

For a more detailed understanding of my invention reference may be had to the accompanying drawings illustrating preferred embodiments of my invention, and in which:

Figure 1 is a longitudinal sectional view of one embodiment of my invention illustrating the clutch elements engaged, Figure 2 is a fragmentary sectional view of the embodiment shown in Figure 1 illustrating the clutch elements disengaged, Figure 3 is a fragmentary sectional view of the same illustrating the initial engagement of the clutch elements, Figures 4 to 6 inclusive illustrate a modified clutch construction showing respectively the engaged, released, and partially engaged position of the clutch elements, and Figures 7 to 9 inclusive illustrate a further modified clutch construction in which the cover plate is yieldingly supported to the flywheel and show respectively the engaged, released, and partially engaged position of the clutch elements.

The various embodiments of my invention illustrated in the accompanying drawings are adapted for assembly with a driving member such as an engine flywheel 10 which is preferably recessed as shown for substantially housing the driving and driven clutch elements such as a pressure plate 11 and a clutch disc 12, the pressure plate and clutch disc being respectively connected in driving relation with the flywheel 10 and driven member or shaft 13. Preferably the pressure plate is connected with the flywheel by means of driving lugs 14 attached to the cover or carrier plate 15 which is in turn secured to the flywheel by means of bolts or other fastening devices 16, said driving lugs engaging slots 17 or other suitable recesses carried by said driving element or pressure plate 11.

It will be noted that the driving and driven elements of the clutch are movably engageable or disengageable for clutch engaging or disengaging action. Means are provided for moving the movable element, which in the present instance comprises a spring or primary yielding means 18 that acts through the pressure multiplying lever means 19 and thrust member 20 on the pressure plate or driving element 11 for packing the driven element or clutch disc 12 between the flywheel 10 and driving element or pressure plate 11. Preferably the spring 18 loads the inner end of the lever means 19, said lever means and spring being also engaged by a clutch releasing means A in the usual manner.

In order to obtain a gradual engagement of the clutch driving and driven elements, I preferably employ secondary yielding means for effecting a gradual increase of pressure between said elements during the clutching action, said secondary yielding means preferably effecting a substantially uniformly increasing pressure between said elements substantially throughout the range of the clutching action. In the embodiment of my invention illustrated in Figures 1 to 3 inclusive I provide a secondary yielding means in the form of a spring annulus 25 disposed between the lever means 19 and cover plate 15. Preferably, this spring annulus is disposed between the cover plate and a fulcrum member 26 to which said pressure multiplying lever means are pivoted, so as to provide a yieldingly supported fulcrum for said lever means. The fulcrum member herein illustrated preferably comprises a ring annulus having inwardly projecting ears 27 to which the levers are pivoted by means of pins 28. The rear face of the fulcrum member 26 is provided with an annular rib or projection 29 adapted for engagement with the spring annulus which in turn engages the annular rib 30 carried by the cover plate 15. These annular ribs 29 and 30 are radially spaced so that one rib engages the spring annulus adjacent the inner peripheral edge, while the other rib engages the spring annulus adjacent the outer peripheral edge.

The operation of clutching is as follows. The clutch parts are positioned as shown in Figure 2 when the clutch is in released position, the clutch disc, flywheel, and pressure plate being slightly spaced as shown, and the primary spring 18 is compressed. It will be noted that the spring annulus which supports the fulcrum member is undeflected. As the primary spring is released and permitted to expand, the initial movement thereof rocks the lever means 19 and brings the pressure plate and flywheel into initial contact with the driven element or clutch disc, the clutch parts being thereby positioned as shown in Figure 3. Further movement and expansion of the spring 18 causes the spring annulus 25, which is engaged by the fulcrum member 26 to be deflected until the lever means is balanced between the said springs and the entire load of the primary yielding means is transmitted to the driving and driven elements. Thus the pressure is gradually built up between said driving and driven elements as the clutch releasing means is actuated to transmit a substantially uniformly increasing pressure to the movable clutch element for effecting a gradual engagement of said driving and driven elements throughout substantially the range of the clutching action.

A like action occurs with the structure illustrated in Figures 4 to 6 inclusive. The levers in this construction are pivotally supported on yieldingly supported pivot pins 40, said pins carried by the lever means and operating in a slot 41 in a bracket member 42 carried by the cover plate 15a, a spring 43 being preferably carried by said bracket and arranged for yielding action on the pin 40 associated therewith. It will be noted that this construction provides a yielding fulcrum that is operated in a manner substantially similar to the operation of the structure in the illustrated embodiment of my invention shown in Figures 1 to 3 inclusive.

In the illustrated embodiment of my invention shown in Figures 7 to 9 inclusive a rigid fulcrum member or bracket 50 is rigidly carried by the cover plate 15b, this modified construction illustrating how the cover plate itself may be yieldingly secured to the flywheel. This is accomplished by providing one or more headed bolts 51 or other suitable means, which engage aligned holes in the cover plate and flywheel, the holes in the flywheel being preferably tapped for receiving the externally threaded bolts 51. A spring means 52 is preferably employed to bear against the cover plate and abutted against the head of each bolt 51, thereby permitting the cover plate to move relatively to the flywheel against the resistance of the spring means 52. The operation of this arrangement is substantially similar to the previously described structures, and it may be obviously seen that this lever means is also supported by a yieldingly supported fulcrum.

It will be apparent to those skilled in the art to which my invention pertains that various modifications and changes may be made therein without departing from the spirit of my invention or from the scope of the appended claims.

What I claim as my invention is:

1. In a clutch, driving and driven members, driving and driven elements respectively connected in driving relation with the driving and driven members, one of said elements being movably engageable and disengageable with the other to effect clutch engagement and disengagement, a cover plate secured to said driving member, means for moving said movable element and including lever means, a fulcrum member for said lever means and secured to said cover plate, and yielding means acting intermediate said cover plate and driving member to provide a yielding fulcrum for said lever means for effecting a gradual engagement of said driving and driven elements during the clutching action.

2. In a clutch having driving and driven elements, one of said elements being movably engageable and disengageable with the other to effect clutch engagement and disengagement, means for moving said movable element and including lever means, fulcrum means for said lever means, a carrier plate supporting said fulcrum means, a driving member adapted to drive said carrier plate, and yielding means intermediate said carrier plate and said driving member.

3. In a clutch having driving and driven elements, one of said elements being movably engageable and disengageable with the other to effect clutch engagement and disengagement, means for moving said movable element and including lever means, fulcrum means for said lever means, primary yielding means loading on one end of said lever means and thereby tending to effect clutch engagement, a flywheel, a cover plate supporting said driving member, and yielding means intermediate said cover plate and said flywheel adapted to permit the cover plate to move yieldingly under load from said primary yielding means.

4. In a clutch having driving and driven elements, one of said elements being movably engageable and disengageable with the other to effect clutch engagement and disengagement, means for moving said movable element and including lever means, fulcrum means for said lever means, primary yielding means loading on one end of said lever means and thereby tending to effect clutch engagement, a flywheel, a cover plate supporting said driving element, and yielding means intermediate said cover plate and said flywheel adapted to permit the cover plate to move yieldingly under load from said primary yielding means, and means driving said driving element from said cover plate.

5. In a clutch having driving and driven elements, one of said elements being movably engageable and disengageable with the other to effect clutch engagement and disengagement, a flywheel, a cover plate driven from the flywheel, and means intermediate the cover plate and flywheel permitting their relative axial separation.

6. In a clutch having driving and driven elements, one of said elements being movably engageable and disengageable with the other to effect clutch engagement and disengagement, a flywheel, a cover plate driven from the flywheel, and means intermediate the cover plate and flywheel permitting their relative axial separation during clutch engagement.

7. In a clutch having driving and driven elements, one of said elements being movably engageable and disengageable with the other to effect clutch engagement and disengagement, means for moving said movable element and including lever means, a flywheel, a cover plate driven by the flywheel and supporting said lever means and having a portion thereof engageable with the flywheel, and yielding means urging said cover plate portion into engagement with said flywheel.

8. In a clutch having driving and driven elements, one of said elements being movably engageable and disengageable with the other to effect clutch engagement and disengagement, means for moving said movable element and including lever means, a flywheel, a cover plate driven by the flywheel and supporting said lever means and having a portion thereof engageable with the flywheel, a stud carried by the flywheel and engaging said cover plate portion, and a coiled spring surrounding said stud and urging said cover plate portion into engagement with said flywheel.

9. In a clutch, a driving flywheel, a pressure plate, a disc adapted to be driven by frictional engagement between the flywheel and pressure plate, lever means for moving the pressure plate, a carrier for said lever means, and means yieldingly connecting said carrier to said flywheel, and primary yielding means thrusting between opposite ends of said lever means.

10. In a clutch, a driving flywheel, a driven disc, a pressure plate, a lever for actuating said pressure plate, means for carrying said lever, and means including a spring for connecting said carrying means to said flywheel, said connecting means being adapted to guide the carrying means for limited axial separating movement from said flywheel.

JAMES O. FINK.